W. A. TURBAYNE.
ELECTRICAL SYSTEM OF DISTRIBUTION.
APPLICATION FILED MAR. 8, 1913. RENEWED DEC. 28, 1917.

1,260,481.

Patented Mar. 26, 1918.
2 SHEETS—SHEET 1.

Witnesses:

Inventor.
William A. Turbayne.
by Edwin B. H. Tower Jr. Atty.

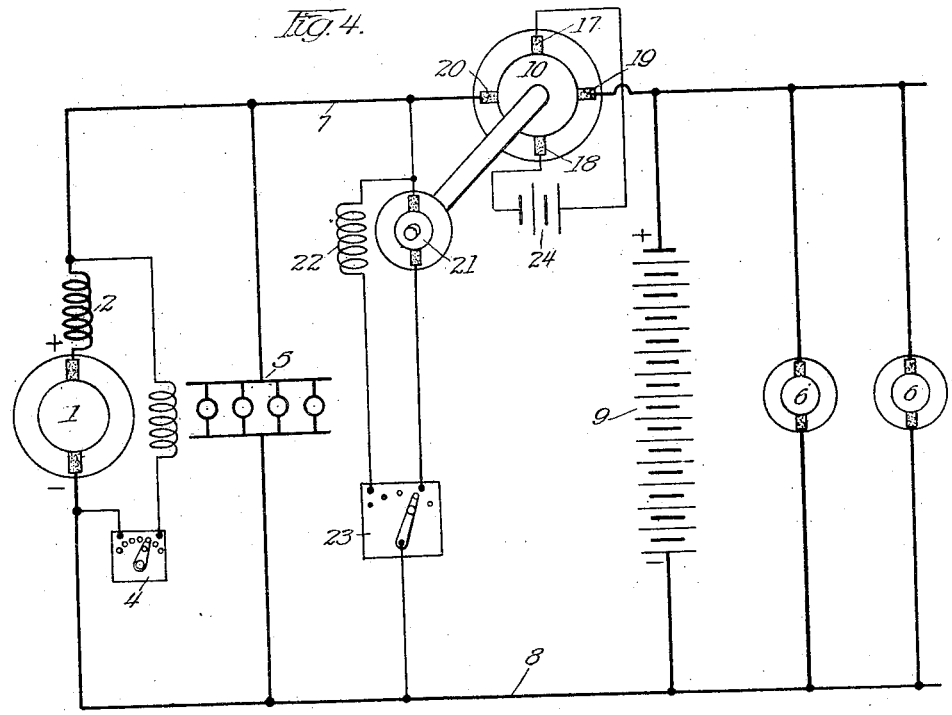
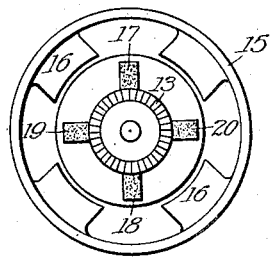
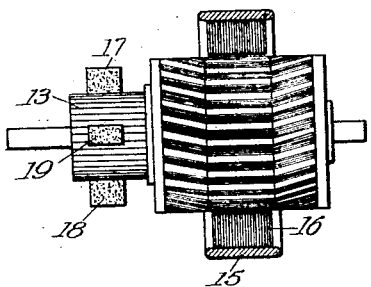

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ELECTRICAL SYSTEM OF DISTRIBUTION.

1,260,481.          Specification of Letters Patent.      Patented Mar. 26, 1918.

Application filed March 8, 1913, Serial No. 752,866. Renewed December 28, 1917. Serial No. 209,366.

*To all whom it may concern:*

Be it known that I, WILLIAM A. TURBAYNE, a citizen of the United States, residing at Niagara Falls, in the county of Niagara and State of New York, have invented new and useful Improvements in Electrical Systems of Distribution, of which the following is a full, clear, concise, and exact description, reference being had to the accompanying drawing, forming a part of this specification.

This invention relates to improvements in electrical systems of distribution.

In many systems of electrical distribution a constant potential source is employed to supply a lighting system and at the same time a widely fluctuating load. Such systems are employed in office buildings where a constant voltage source supplies the lights and also the electric elevators. It is, of course, very desirable that the lights shall be free from noticeable fluctuations. In order that the intermittent and heavy demands imposed by the elevator motors shall not reflect back on the lighting circuit, it is customary to connect the lights across the constant voltage source and to interpose a booster of special type between the lighting circuit and the fluctuating load. The booster is so regulated that only current of a substantially constant value may pass through its armature, any excess demand of the load being supplied by a storage battery which is connected across the fluctuating load circuit. The booster regulating means is so arranged that only a current equal to the average current requirement of the load and a small additional amount necessary to maintain the battery in charged condition may pass therethrough. Should the demand of the fluctuating load exceed this predetermined constant value, the regulating means will cause the booster to develop an E. M. F. causing a drop in voltage between the constant voltage source and the load, thereby causing the battery to discharge and supply the excess demand.

Systems of this type heretofore employed have not responded instantaneously to variations in the current demand with the result that the battery did not instantaneously take up the overload so that a portion of the demand was furnished by the constant voltage source, causing a disturbance in the lamp circuit. This sluggishness in action is due to various causes, resulting, for example, from a time lag in the regulator due to inertia in the regulating devices or a lag in booster magnetism due to inductance in its field windings or to hysteresis.

An object of this invention is to provide a booster system which will instantaneously respond to circuit conditions.

Another object of the invention is to provide an improved booster, the regulating action of which is entirely brought about by its armature current.

These and other objects may be attained by the embodiments illustrated in the accompanying drawings, in which:

Fig. 4 represents diagrammatically a modified system.

Figs. 5 and 6 illustrate respectively an end view and a vertical section of the improved booster employed in Fig. 4.

Figure 1:
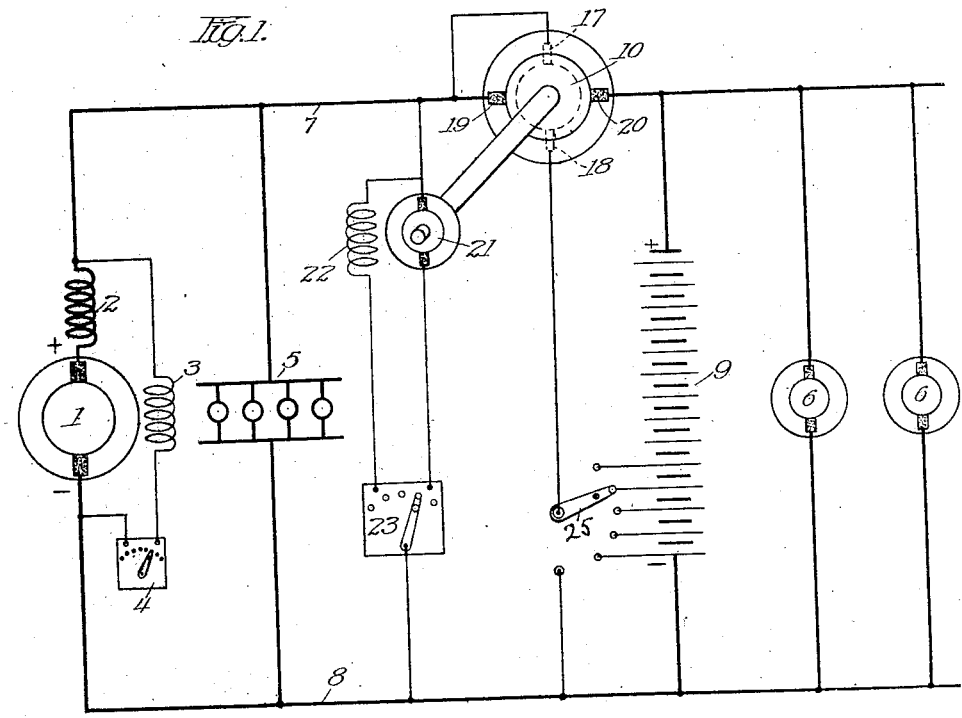
Figure 1 represents diagrammatically a preferred embodiment of the invention.

Fig. 1 illustrates a constant voltage source of any preferred type. In this instance a generator is provided with an armature 1, a series field 2, and a shunt field 3. Suitable automatic or other regulating means 4 may be employed to regulate the shunt field. A lighting circuit 5 and a variable load, here illustrated as motors, 6 are connected across the main leads 7 and 8. A storage battery 9 is connected across the variable load circuit, the number of cells of the battery being so chosen that the battery will neither charge nor discharge at the normal voltage of the source. A regulating booster is connected in series in the lead 7 between the lamp circuit and the storage battery.

Figure 2:
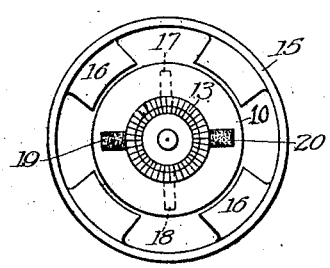
Figs. 2 and 3 are respectively an end view and a vertical section diagrammatically illustrating the improved booster.
Figure 3:
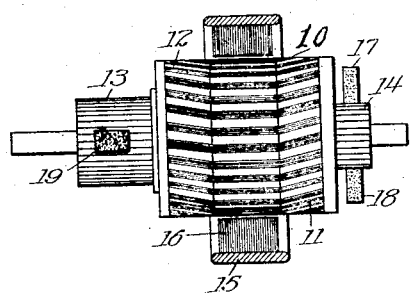

The booster, shown more in detail in Figs. 2 and 3, comprises an armature 10 provided with two distinct armature windings 11 and 12, each connected with a commutator 13 or 14 in the usual manner. The armature revolves within a yoke 15, preferably of iron or steel, provided with pole pieces 16, but with no windings. The purpose of the pole pieces is simply to gather up and complete the magnetic circuit for the flux set up by current flowing through the armature windings. This purpose would be served as well by a continuous ring without definite polar projections, but such a structure would give rise to undesirable sparking at the brushes. To provide neutral spaces to insure good commutation and sparkless operation of the brushes, therefore, the external ring is preferably cut away, as illustrated, forming the pole pieces.

The armature winding 11 is of comparatively high resistance and is connected by brushes 17 and 18 across the constant voltage source. The armature winding 12 is of comparatively low resistance and is connected by brushes 19 and 20 in series in the lead 7.

The booster is driven by any desired means as, for example, by the motor 21 connected across the leads 7 and 8 and provided with a shunt field 22 controlled by a starting box 23.

Upon the passage of current through the armature winding 12 connected through the brushes 19 and 20, a magnetic flux will be developed having a symmetry axis in line with these brushes and upon rotation of the armature an E. M. F. will be developed across the brushes 17 and 18 at right angles to this flux axis. The windings are so proportioned that with the passage of the predetermined desired constant current through the winding 12 the E. M. F. developed across brushes 17 and 18 will be just equal to the E. M. F. of the source so that no current will flow in the armature winding between these brushes. The voltage across the load circuit will, therefore, be equal to the voltage of the source and the battery will just float across the line.

Increase of current through brushes 19 and 20, due to an increase in demand by the motors, will cause the E. M. F. developed across brushes 17 and 18 to predominate over the E. M. F. of the source, with the result that a current will flow between brushes 17 and 18 through the winding 11. A magnetic flux will consequently be set up in line with these brushes 17 and 18 which will develop an E. M. F. across brushes 19 and 20 in a direction to oppose the E. M. F. of the source, causing, therefore, a reduction in voltage across the fluctuating load circuit. Under these conditions the battery will discharge into the load circuit to meet the excess demand.

A decrease of current through brushes 19 and 20 below the normal demand will, of course, result in the E. M. F. across brushes 17 and 18 falling below that of the source, with the result that current will flow between brushes 17 and 18, through the armature winding 11 in the opposite direction. This will develop an E. M. F. across brushes 19 and 20 in a direction to assist the E. M. F. of the source, thus causing a charging current to flow to the battery.

The result under either condition is to tend to hold the current flowing through the brushes 19 and 20 to a constant normal value. The degree of departure from an absolutely constant value required to bring the regulating functions of the booster into action will be determined wholly by the proportioning of the armature windings both as to the relative number of effective turns and their resistance.

Fig. 4 illustrates a similar system in which, however, a single armature winding is utilized to carry both the magnetizing and working components of current. In this case the brushes 17 and 18 which carry the magnetizing component of current are connected across an independent source of relatively low E. M. F. as, for example, a few cells of storage battery 24. The brushes 17 and 18 and 19 and 20 are arranged to bear on the same commutator and are spaced ninety electrical degrees apart. As the magnetizing component of current through brushes 17 and 18 and the working component of current through brushes 19 and 20 flow through the armature winding at right angles, the current at any instant in two quarters of the armature winding will be the sum of these two components while the current in the other two quarters will be the difference between these two components. The heating and other effects will, therefore, be proportional only to the vector sum of these two components of current.

The electrical operation of this system is exactly similar to the operation of the system illustrated in Fig. 1.

In a booster of either form illustrated, the current entering the armature winding through one set of brushes, acting upon the magnetic flux at right angles thereto, exerts a torque as a motor, absorbing energy from the system, while the current entering the armature winding through the other set of brushes will have a generator action, restoring energy to the system. Consequently, in order to drive such a booster, a comparatively small motor may be utilized having simply a capacity sufficient to drive a complete set at the desired speed against the internal losses.

Various means may be employed to vary the predetermined constant current which the booster will admit to the load circuit.

Thus in Fig. 1, a switch 25 is provided, by means of which cells of the battery may be introduced to vary the voltage opposed to the E. M. F. across the brushes 17 and 18. A similar result may be obtained in Fig. 4 by varying the number of cells in the battery 24. In either case should the E. M. F. across the brushes 17 and 18 be opposed to a source of reduced voltage, a lesser current through brushes 19 and 20 would effectively develop the E. M. F. required to neutralize the E. M. F. of the constant source across which the brushes 17 and 18 are connected.

The same effect may be obtained by varying the speed of the driving motor for it is obvious that if the booster speed is reduced a greater current would be necessary through brushes 19 and 20 to develop the proper E. M. F. across brushes 17 and 18 to neutralize the E. M. F. of the constant source.

In the type of booster herein described, the variations of magnetic flux will be in absolute time relation with the variations of current through the armature windings and as no field windings or closed electric circuits of any description surround the external magnetic circuit to delay the flux changes, this booster will respond instantaneously upon variation of current from the normal value.

What I claim as new and desire to secure by Letters Patent of the United States is:

1. The combination, in a system of electrical distribution, of a load circuit, a generator, and a battery, each connected across leads of said load circuit, and a dynamo electric machine provided with armature windings connected in series between said generator and battery and provided with armature windings connected across said generator.

2. In a system, two circuits between which there is a variable difference in voltage, means for causing a practically constant current to flow therebetween, said means comprising a dynamo electric machine having two sets of brushes spaced substantially ninety electrical degrees apart and having a portion of its armature windings connected by one set of said brushes in series between said circuits and a portion of its armature windings connected across said circuits by the other set of said brushes.

3. In combination, a constant potential source, a fluctuating load, an auxiliary source, and a dynamo electric machine connected between said sources, said dynamo electric machine having two sets of brushes spaced ninety electrical degrees apart and having its armature windings connected by one set of said brushes in series between said sources and also having its armature windings connected across said constant potential source by the other set of said brushes.

4. In an electrical system of distribution, a constant potential source, a lighting circuit connected across said source, a load circuit including a fluctuating load, a storage battery connected across said load circuit, and a constant current booster, said booster being provided with brushes connecting the armature of said booster across said constant potential source, and said booster also being provided with brushes connecting the armature of said booster in series between said lighting circuit and said fluctuating load circuit.

5. In an electrical system of distribution, a constant potential source, an auxiliary source, a fluctuating load, and a constant current booster for determining the amount of said load carried by each source, said booster having armature windings connected across said constant potential source in opposition to said source, and said booster also having armature windings connected in series between said sources.

6. In a system of electrical distribution, a constant potential source, a load circuit connected across said source, a second load circuit including a fluctuating load, and a constant current booster, said booster having armature windings connected across said source in opposition thereto, and said booster also having armature windings connected in series between said load circuits.

7. In an electrical system of distribution, a constant potential source, a widely fluctuating load, an auxiliary source connected across said load, and a regulating dynamo-electric machine for determining the proportion of load carried by each source, said generator being free of field windings, said dynamo-electric machine having its armature connected in series between said sources and being regulated by the current flowing through said armature.

8. In an electrical system of distribution, a constant voltage source, an auxiliary source, a variable load supplied by said sources, and a booster for determining the proportion of load carried by each source, said booster having its armature connected in series between said sources and being regulated solely by armature current, whereby the regulating action of said booster is in absolute time relation with fluctuations in current from said sources.

9. In an electrical system of distribution, a constant voltage source, a fluctuating load, an auxiliary source connected across said load, and a regulating booster for determining the proportion of load carried by each source, said booster being provided with two sets of brushes, the armature of said booster being connected to one set of said brushes across said constant voltage source, and the armature of said booster also being connected to the other set of said brushes in series between said sources.

10. In an electrical system of distribution, a constant potential source, and a regulating booster, said booster being provided with a pair of brushes connecting windings of the armature of said booster across said source in opposition thereto, and said booster also being provided with a pair of brushes connecting windings of the armature of said booster in series with said source, said windings being so proportioned that a predetermined current through said series brushes will develop an E. M. F. across said first pair of brushes exactly equal and opposite to the E. M. F. of said source, whereby a decrease in said predetermined current will cause said source to send a current through said first pair of brushes in one direction, and an increase in said predetermined current will cause the E. M. F. across said first pair of brushes to predominate over the E. M. F. of said source.

11. In a system, two circuits between which there is a varying difference of voltage, means for causing a practically constant current to flow therebetween, said means comprising a dynamo electric machine provided with brushes connected to armature windings and spaced ninety electrical degrees apart, one pair of said brushes being connected in series between said circuits and another pair of said brushes being connected across a practically constant voltage source.

In witness whereof, I have hereunto subscribed my name in the presence of two witnesses.

WILLIAM A. TURBAYNE.

Witnesses:
 JAMES L. COUGHLIN,
 F. G. SWAUNIE.

Copies of this patent may be obtained for five cents each, by addressing the "Commissioner of Patents, Washington, D. C."